(12) United States Patent
Zhao

(10) Patent No.: US 11,381,542 B2
(45) Date of Patent: Jul. 5, 2022

(54) GENERIC ROUTING ENCAPSULATION (GRE) DOMAIN NAME SERVICE (DNS) RESOLUTION USING EMBEDDED ROUTER (EROUTER) AND EMBEDDED CABLE MODEM (ECM) PHYSICAL INTERFACE

(71) Applicant: ARRIS Enterprises LLC, Suwanee, GA (US)

(72) Inventor: Wen Ji Zhao, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/361,810

(22) Filed: Jun. 29, 2021

(65) Prior Publication Data

US 2022/0029951 A1    Jan. 27, 2022

Related U.S. Application Data

(60) Provisional application No. 63/054,442, filed on Jul. 21, 2020.

(51) Int. Cl.
| | |
|---|---|
| *H04L 61/4511* | (2022.01) |
| *H04L 12/46* | (2006.01) |
| *H04L 45/42* | (2022.01) |
| *H04L 45/741* | (2022.01) |
| *H04L 61/5007* | (2022.01) |
| *H04L 61/251* | (2022.01) |

(52) U.S. Cl.
CPC ...... *H04L 61/1511* (2013.01); *H04L 12/4633* (2013.01); *H04L 45/42* (2013.01); *H04L 45/741* (2013.01); *H04L 61/2007* (2013.01); *H04L 61/251* (2013.01)

(58) Field of Classification Search
CPC ............ H04L 61/1511; H04L 61/2007; H04L 61/251; H04L 12/4633; H04L 45/42; H04L 45/741

See application file for complete search history.

(56) References Cited

U.S. PATENT DOCUMENTS

| | | |
|---|---|---|
| 2006/0126584 A1 | 6/2006 | Zhang et al. |
| 2017/0078285 A1* | 3/2017 | Lee ................. H04N 21/25816 |
| 2020/0295961 A1* | 9/2020 | Zhuang .................. H04L 12/66 |

OTHER PUBLICATIONS

International Search Report and Written Opinion of the International Searching Authority dated Sep. 21, 2021, in International (PCT) Application No. PCT/US21/039561.

(Continued)

*Primary Examiner* — Brian Whipple
(74) *Attorney, Agent, or Firm* — Wenderoth, Lind & Ponack, L.L.P.

(57) ABSTRACT

A network device having an embedded router (eRouter) providing connections for a plurality of client devices in a local area network, and an embedded cable modem (eCM) bridging communication between a wide area network (WAN) network and the eRouter. The network device also includes a memory, and at least one processor configured to execute instructions stored on said memory to cause said network device to implement an eRouter physical interface and an eCM physical interface according to a configuration file, and to transmit a generic routing encapsulation (GRE) domain name system (DNS) query to a DNS server from the eRouter physical interface or the eCM physical interface.

20 Claims, 8 Drawing Sheets

(56) References Cited

OTHER PUBLICATIONS

Leymann et al., "GRE Notifications for Hybrid Access; draft-lhwxz-gre-notifications -hybrid-access-01, txt", Internet Engineering Task Force, IETF; Standardworkingdraft, Internet Society (ISOC) 4, 2015, pp. 1-36.

Jim Luciani et al., "Using DNS for VPN Discovery; draft-luciani-ppvpn-vpn-discovery-03.txt", Internet Engineering Task Force, IETF; Standardworkingdraft, Internet Society (ISOC) 4, No. 3, 2002, pp. 1-8.

* cited by examiner

GENERIC ROUTING ENCAPSULATION (GRE) DOMAIN NAME SERVICE (DNS) RESOLUTION USING EMBEDDED ROUTER (EROUTER) AND EMBEDDED CABLE MODEM (ECM) PHYSICAL INTERFACE

BACKGROUND

Embodiments of the invention relate to GRE DNS resolution and tunnel creation in network device having eRouter and eCM.

IP serves as the base for a number of different protocols; by far the most common are TCP, UDP, and ICMP. IP over IP (i.e., an IP packet encapsulated within another IP packet) may be used for tunneling protocols over ordinary IP networks. TCP is the protocol most commonly used for services on the Internet. For example, Telnet, FTP, SMTP, NNTP, and HTTP are all TCP-based services. TCP provides a reliable, bidirectional connection between two endpoints.

Tunnels provide a way to transport protocols that the underlying network does not support. For example, a network infrastructure may not support a particular protocol being used, the network infrastructure may not be able to route the packets due to a lack of routing information or addressing types (public addressing vs. private addressing), and the network infrastructure may not support the traffic type (multicast or broadcast). Generic Routing Encapsulation (GRE) is a tunneling protocol that encapsulates network layer protocols inside virtual point-to-point links over an Internet Protocol (IP) network. The two endpoints are identified by the tunnel source and tunnel destination addresses at each endpoint.

Some network devices include both an embedded cable modem (eCM) and an embedded router (eRouter). The cable modem bridges frames between a client LAN and an operator's WAN network. The eRouter uses a DHCP server to provide the LAN with IP network addressing. At initiation, a configuration file is downloaded to the network device. An application programming interface implements a physical interface at the eRouter for configuring the GRE tunnel. However, the eCM may have a separate subnet with a different IP address range than the eRouter side. The user may want to configure a GRE tunnel on the eCM side. For example, the eRouter may be configured with an IPv4 IP address range, whereas the eCM may be configured with an IPv6 address range. Thus, a physical interface on the eCM side would be advantageous so that a GRE tunnel may be configured on the eCM side for the range of addresses that may be configured on the eCM side.

SUMMARY

Aspects of the present invention are directed to a network device having an embedded router (eRouter) and an embedded cable modem (eCM). an API supports selection of the nameserver, selection of the sending interface, and selection of different querying types. The API provisions an eRouter physical interface and an eCM physical interface that allows selection of transmission of the DNS request either from the eRouter side or from the eCM side.

BRIEF SUMMARY OF THE DRAWINGS

The accompanying drawings, which are incorporated in and form a part of the specification, illustrate example embodiments and, together with the description, serve to explain the principles of the present disclosure. In the drawings.

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
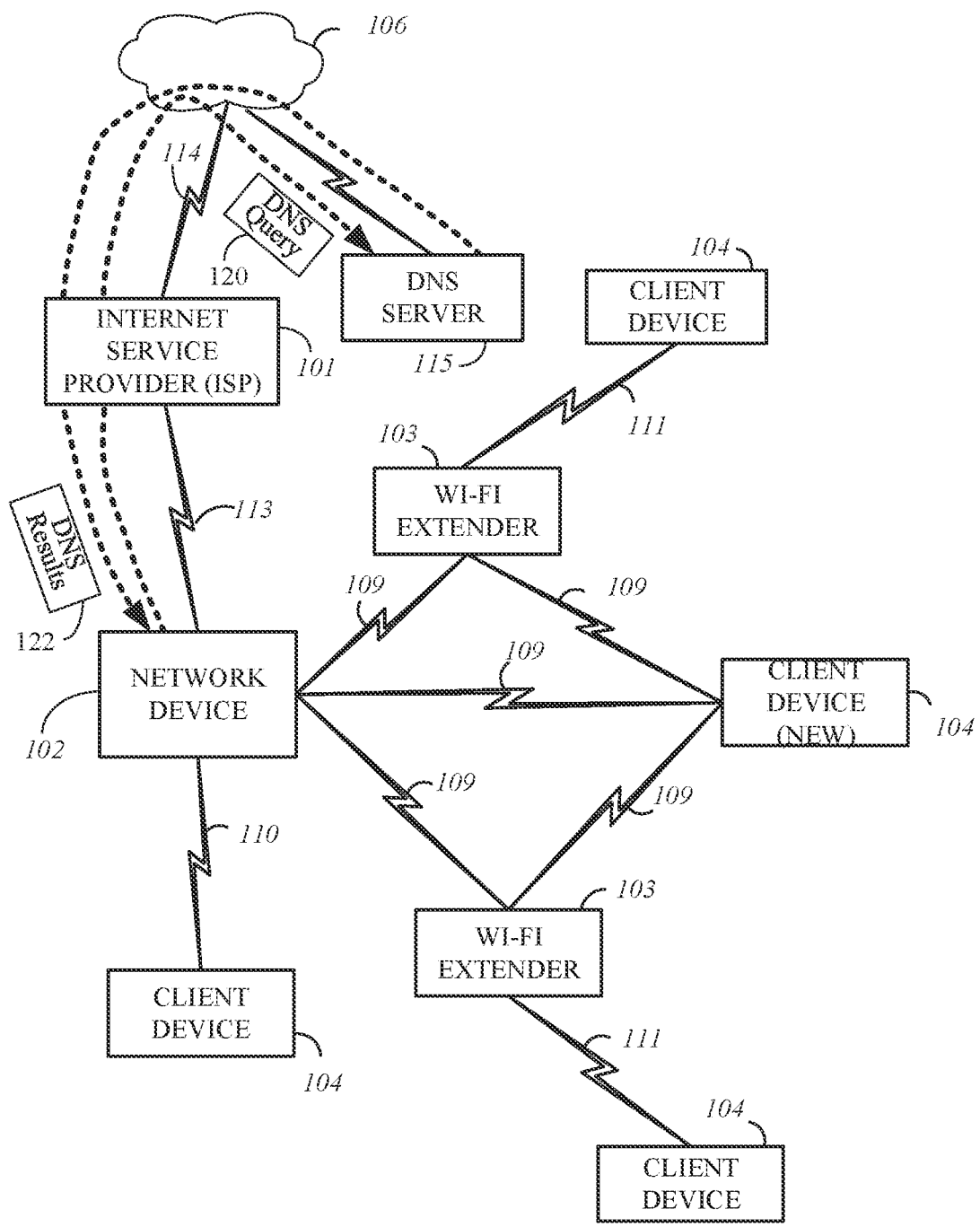
FIG. 1 is a schematic diagram of a system according to an embodiment of the present disclosure.

FIG. 1 is a schematic diagram of a system according to an embodiment of the present disclosure.

As shown in FIG. 1, the main elements of the system include a network device 102 connected to the Internet 106 via an Internet Service Provider (ISP) 101 and also connected to different wireless devices such as wireless extenders 103 and client devices 104. The system shown in FIG. 1 includes wireless devices (e.g., wireless extenders 103 and client devices 104) that may be connected in one or more wireless networks (e.g., private, guest, iControl, backhaul network, or Internet of things (IoT) network) within the system. Additionally, there could be some overlap between wireless devices (e.g., wireless extenders 103 and client devices 104) in the different networks. That is, one or more network devices could be located in more than one network. For example, the wireless extenders 103 could be located both in a private network for providing content and information to a client device 104 and also included in a backhaul network or an iControl network.

Starting from the top of FIG. 1, the ISP 101 can be, for example, a streaming video provider or any computer for connecting the network device 102 to the Internet 106. The connection 114 between the Internet 106 and the ISP 101 and the connection 113 between the ISP 101 and the network device 102 can be implemented using a wide area network (WAN), a virtual private network (VPN), metropolitan area networks (MANs), system area networks (SANs), a DOC- SIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 113 can further include as some portion thereof a broadband mobile phone network connection, an optical network connection, or other similar connections. For example, the connection 113 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 113 is capable of providing connections between the network device 102 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The network device 102 can be, for example, a hardware electronic device that may be a combination modem and gateway device that combines the functions of a modem, an access point, and/or a router for providing content received from the content provider 101 to network devices (e.g., wireless extenders 103 and client devices 104) in the system. It is also contemplated by the present disclosure that the network device 102 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connection 109 between the network device 102, the wireless extenders 103, and client devices 104 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 109 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 109 can include connections to a media over coax (MoCA) network. One or more of the connections 109 can also be a wired Ethernet connection.

The wireless extenders 103 can be, for example, hardware electronic devices such as access points used to extend the wireless network by receiving the signals transmitted by the network device 102 and rebroadcasting the signals to, for example, client devices 104, which may out of range of the network device 102. The wireless extenders 103 can also receive signals from the client devices 104 and rebroadcast the signals to the network device 102, or other client devices 104.

The connection 111 between the wireless extenders 103 and the client devices 104 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 111 can be implemented using a wireless connection that operates in accordance with, but is not limited to, RF4CE protocol, ZigBee protocol, Z-Wave protocol, or IEEE 802.15.4 protocol. Also, one or more of the connections 111 can be a wired Ethernet connection.

The client devices 104 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the network device 102. Additionally, the client devices 104 can be a TV, an IP/QAM STB or an SMD that is capable of decoding audio/video content, and playing over OTT or MSO provided content received through the network device 102.

The connection 110 between the network device 102 and the client device 104 is implemented through a wireless connection that operates in accordance with, but is not limited to, any IEEE 802.11 protocols. Additionally, the connection 110 between the network device 102 and the client device 104 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 110 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 110 can also be a wired Ethernet connection.

Figure 2:
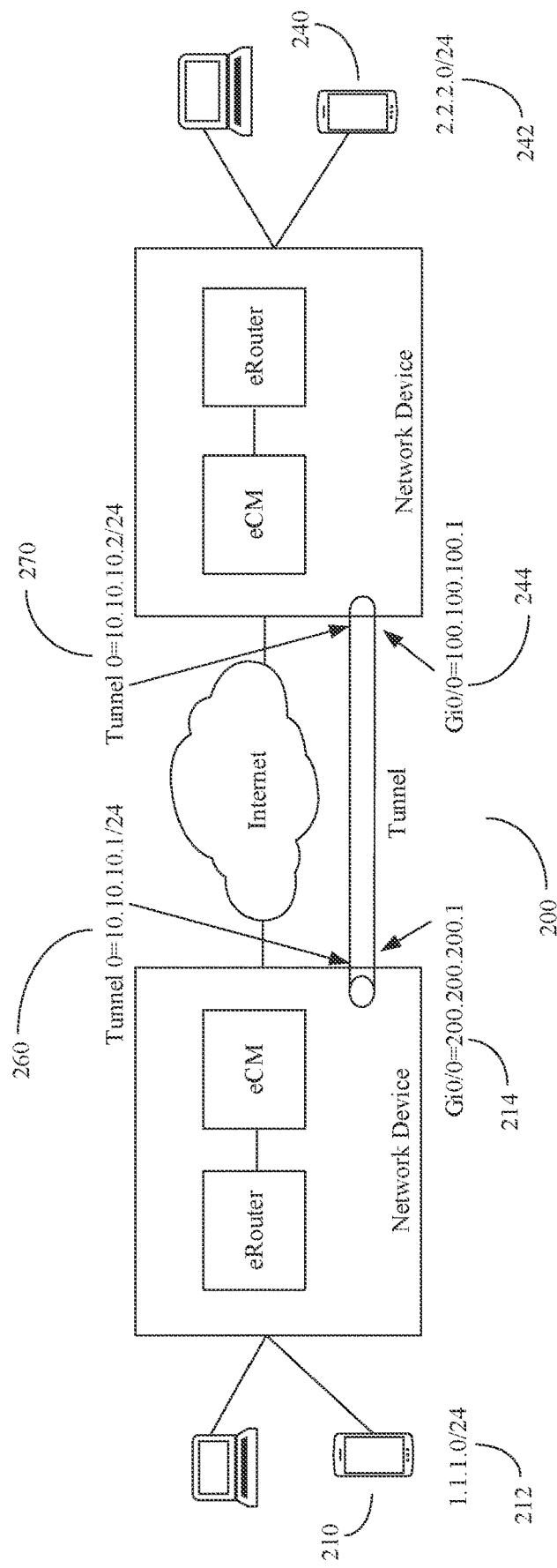
FIG. 2 illustrates configuration of a GRE tunnel in accordance with the present invention.

A detailed description of the exemplary internal components of the network device 102, the wireless extenders 103, and the client devices 104 shown in FIG. 1 will be provided in the discussion of FIG. 2. However, in general, it is contemplated by the present disclosure that the network device 102, the wireless extenders 103, and the client devices 104 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the network device 102, the wireless extenders 103, and the client devices 104 may be adapted to execute any operating system, including Linux, UNIX, Windows, MacOS, DOS, and ChromOS as well as virtual machines adapted to virtualize execution of a particular operating system, including customized and proprietary operating systems. The network device 102, the wireless extenders 103, and the client devices 104 are further equipped with components to facilitate communication with other computing devices over the one or more network connections to local and wide area networks, wireless and wired networks, public and private networks, and any other communication network enabling communication in the system.

A DNS Server 115 is shown coupled to the Internet 106 for providing resolution of IP addresses in response to DNS queries 120. The network device 102 may perform a DNS Query against the DNS server 115 by supplying a hostname associated with a target device. The DNS server 115 takes the hostname and resolves it into a numeric IP address and provides the DNS results 122 to the network device 102. The network device 102 may connect with a target device then using the IP address returned by the DNS server 115.

FIG. 2 illustrates configuration of a GRE tunnel 200 in accordance with the present invention.

In FIG. 2, a first site represented by mobile device 210 has LAN subnet of 1.1.1.0/24 212. The WAN IP address 214 is 200.200.200.1. The second site represented by mobile device 240 has LAN subnet 2.2.2.0/24 242. The WAN IP address 244 is 100.100.100.1. Tunnel 200 may be configured across both sites for LAN to LAN communication.

A command is used to create a tunnel interface by configuring an IPv4 address 260 for the new tunnel interface and to configure a source IP address 270 and destination IP address 272 for the tunnel interface.

On the first side, the IPv4 address 260 of 10.10.10.1 255.255.255.252 is configured. A tunnel source IP address 270 of pf 200.200.200.1 is configured on the first side. A tunnel destination IP address 272 of 100.100.100.1 is then configured for the first side.

Then a tunnel interface that includes an IPv4 Address 270 for the new tunnel interface, and a source IP address 272 and a destination IP address 274 for the tunnel interface on the second side are configured. On the second side, IPv4 IP address 270 of 10.10.10.2 255.255.255.252 is configured. On the second side, the tunnel source IP address 272 is configured as 100.100.100.1 and the tunnel destination IP address 274 of 200.200.200.1 is configured. Now that configuration is completed on both sides, respectively, the GRE tunnel 200 is configured and both side LAN users can communicate with each other.

Figure 3:
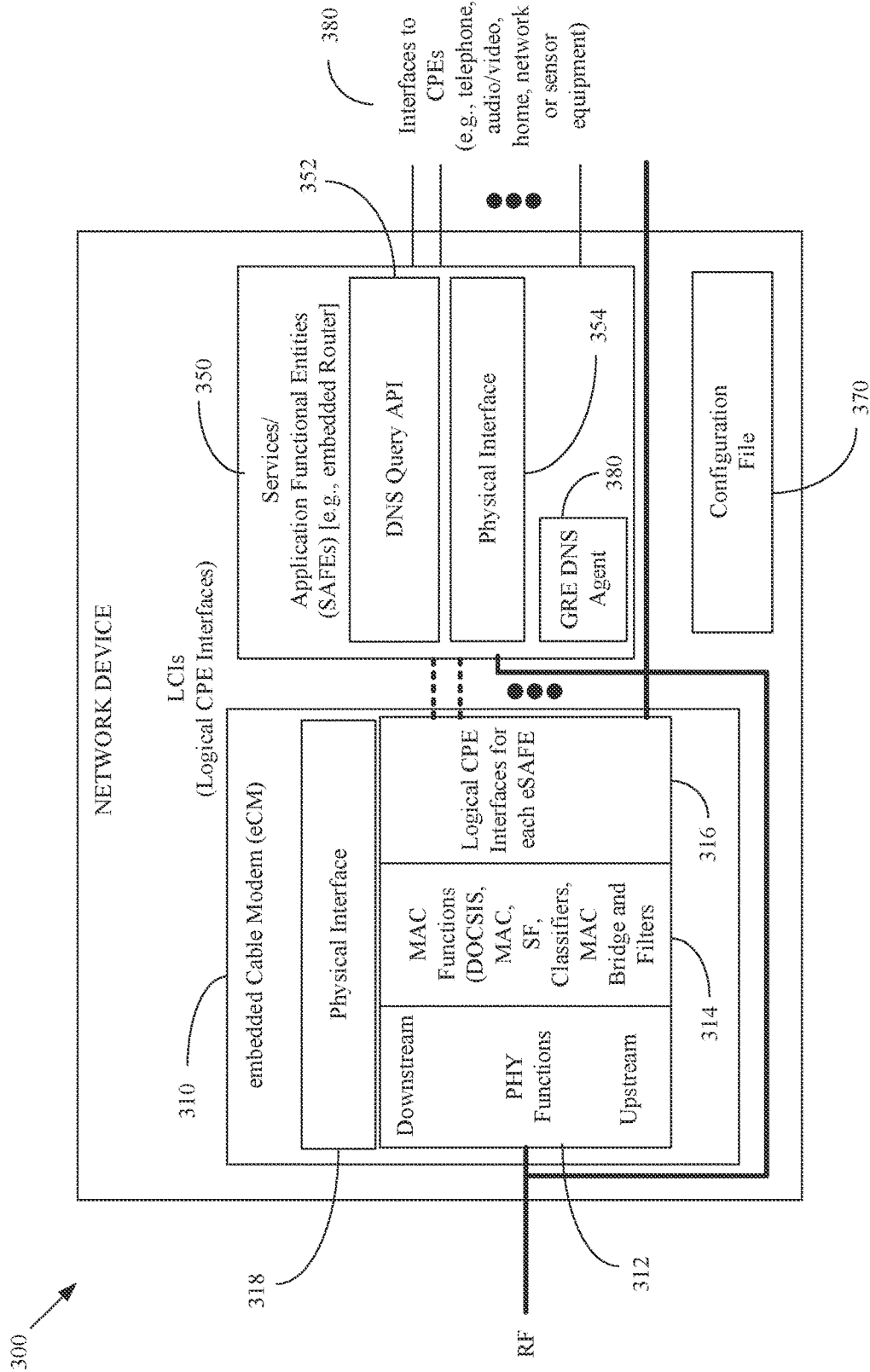
FIG. 3 is a block diagram of a network device in accordance with the present invention.

FIG. 3 is a block diagram of a network device 300 in accordance with the present invention.

In FIG. 3, an embedded cable modem (eCM) 310 and an embedded router (eRouter) 350 are implemented in the network device 300. The eCM 310 and eRouter 350 are configured at initialization using a configuration file 370. The eCM 310 includes downstream and upstream physical (PHY) functions 312, MAC functions 314, and logical customer-provided equipment (CPE) interfaces 316 for embedded Service/Application Functional Entities (eSAFEs), such as eRouter 350. The PHY functions 312 links for transmitting information and control bits between communication peers. The MAC functions 314 include functions such as encapsulating higher-level frames into frames appropriate for the transmission medium, adding a frame check sequence to identify transmission errors, and forwarding the data to the physical layer as soon as the appropriate channel access method permits. The logical CPE interfaces 316 provide bridging of traffic between the eCM and eSAFEs.

The eRouter includes an DNS Query API 352 that supports selection of the nameserver (e.g., the DNS server), selection of the sending interface (e.g., a physical interface 318 of the eCM 310 or a physical interface 354 of the eRouter 350), and selection of different querying types (e.g., SRV, A, and/or 4A).

The DNS Query API 352 provisions a physical interface 318 for the eCM 310 and a physical interface 354 for the eRouter 350. The physical interface 354 implemented for the eRouter 350 is used to execute transmission of a DNS query from the eRouter 350. The physical interface 318 of the eCM 310 is used to execute transmission of a DNS query from the eCM 310. A plurality of CPE interfaces 380 from the eRouter 350 provide connections to client devices in a local area network.

The physical interface 318 for the eCM 310 and the physical interface 354 for the eRouter 350 may be used to select the nameserver (e.g., the DNS server), to select the sending interface (e.g., a physical interface 318 of the eCM 310 and/or physical UI 354 of the eRouter 350), and to select a query type (e.g., SRV, A, and/or 4A).

The physical UI 354 of the eRouter 350 and the physical UI 318 of the eCM 310, as defined in the configuration file 370, are used to send a DNS query 120 and to receive a DNS result resolving IP address for the GRE tunnel. The DNS server 115 as shown in FIG. 1 receives the DNS query 120 and provides an IP address as DNS Results 122 for configuring a GRE tunnel. After the IP addresses have been resolved, the GRE Tunnel is setup and data that is encapsulated in GRE packets may be sent using the GRE tunnel Resolved IP addresses for the GRE tunnel creation are selected using the physical interface 318 of the eCM 310 and/or the physical interface 354 of the eRouter 350. When the eRouter 350 is used to execute sending the GRE DNS query and the gateway IPv4 mode is selected, the first resolved IPv4 address is used. When the eRouter 350 is used to execute sending the GRE DNS query and the gateway IPv6 mode is selected, the first resolved IPv6 address is used. When the eRouter 350 is used to execute sending the GRE DNS query and the gateway dual stack mode is selected, the first resolved IPv6 address is preferred, but when no IPv6 address is resolved, the first resolved IPv4 address is used.

When the eCM 310 is used to execute sending the GRE DNS query and the CM IPv4 mode is selected, the first resolved IPv4 address is used. When the eCM 310 is used to execute sending the GRE DNS query and the CM IPv6 mode is selected, the first resolved IPv6 address is used. When the eCM 310 is used to execute sending the GRE DNS query and the CM dual stack mode is selected, the first resolved IPv6 address is preferred, but when no IPv6 address is resolved, the first resolved IPv4 address is used. The API usage must be combined with the eRouter/eCM mode (IPv4/IPv6/Dual-Stack) and the DNS name server type (IPv4/IPv6). Also, the eRouter/eCM mode is considered when processing the DNS querying results. Thus, the DNS resolution API 352 is used to select the nameserver (e.g., the DNS server), to select the sending interface (e.g., the physical interface 318 of the eCM 310 or the physical interface 354 of the eRouter 350), and to select querying types (e.g., SRV, A, and/or 4A).

Figure 4:
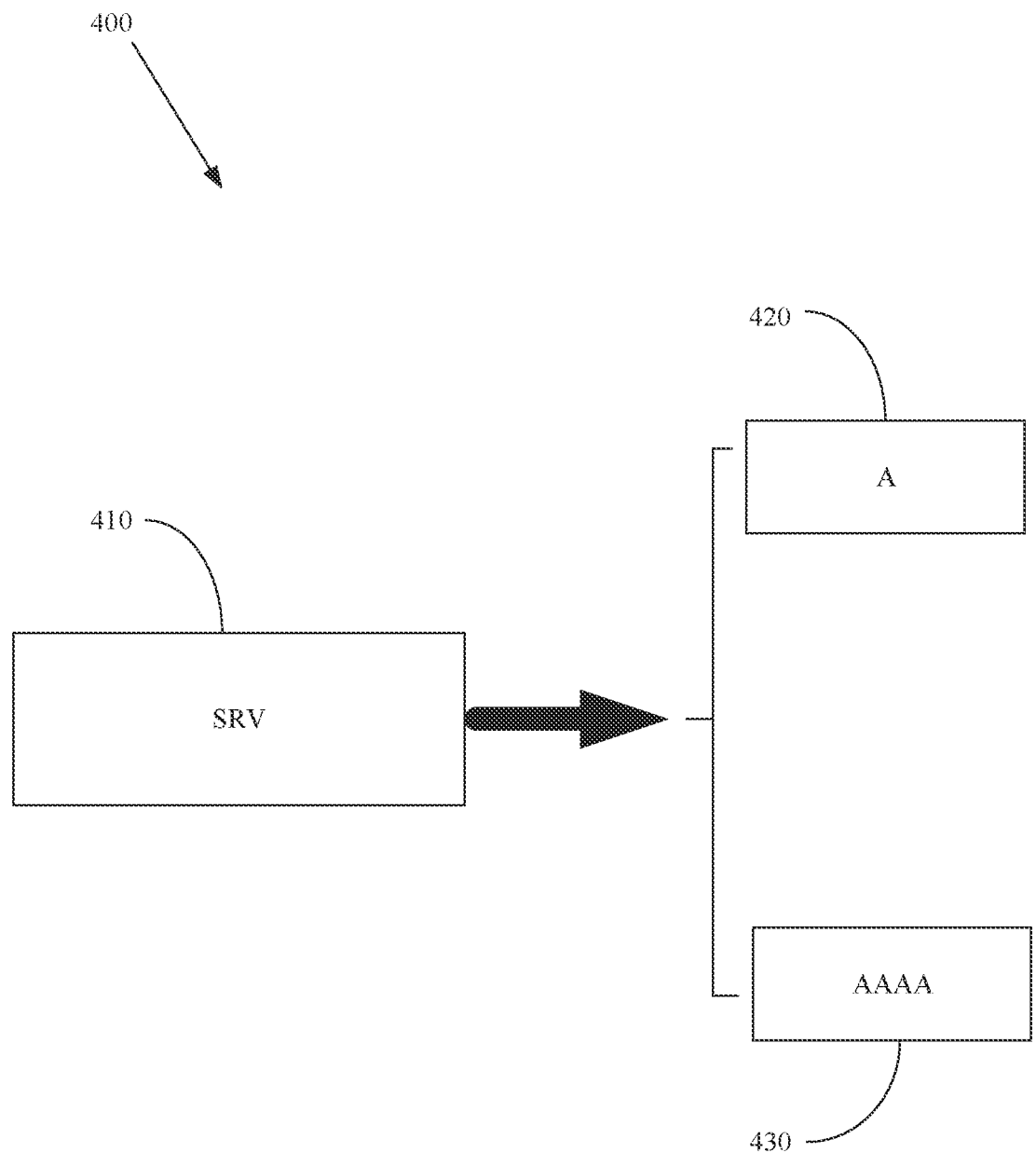
FIG. 4 illustrates resource records accessed in response to a DNS query according to the present invention.

FIG. 4 illustrates resource records 400 accessed in response to a DNS query according to the present invention.

Resource records 400 provide DNS-based information about the hardware and software components that point to and support domains (e.g., hosts, name servers, web servers, email servers). The DNS records 400 include the Service record (SRV record) 410, the A records 420, and the AAAA records 430. For DNS resolution for GRE remote endpoint addresses, first the SRV query is performed. Then the A query and the 4A query are performed.

The Service record (SRV record) 410 is a specification of data in the DNS that defines the location, i.e., the hostname and port number of servers for specified services. The SRV record 410 allows the use of several servers for a single domain to move services from host to host and, to designate some hosts as primary servers for a service and others as backups. The A records 420 return a 32-bit IPv4 address that is used for conversion of domain names to each IP addresses. The AAAA Records 430 specifies IPv6 address for the given host.

Referring again to FIG. 3, the eRouter 350 includes a GRE DNS agent 380 located on the eRouter side. The GRE DNS agent 380 updates and monitors the mapping for the host name to IP address (e.g., A record 320, or AAAA record 330). When an IP address of change, the GRE DNS agent 380 on the eRouter 350 informs the DNS server of the new IP address. The DNS server automatically re-maps the domain name with the changed IP address. The GRE DNS agent 380 performs these tasks for a DNS zone when failing over nodes across subnets (a wide-area failover). The GRE DNS agent 380 may be used when the failover source and target nodes are on different subnets. The GRE DNS agent 380 updates the nameserver and allows clients to connect to the failed over instance of the application service.

Thus, a DNS query 120 may be sent from the eCM 310 using the eCM physical interface 318 or from the eRouter 350 using the eRouter physical interface 354. Due to different configurations, e.g., the eCM using a different range of IP addresses than the eRouter, there may be a preference to send the DNS query 120 from the same interface where the GRE tunnel terminated, e.g., the eCM physical interface 318.

Figure 5:
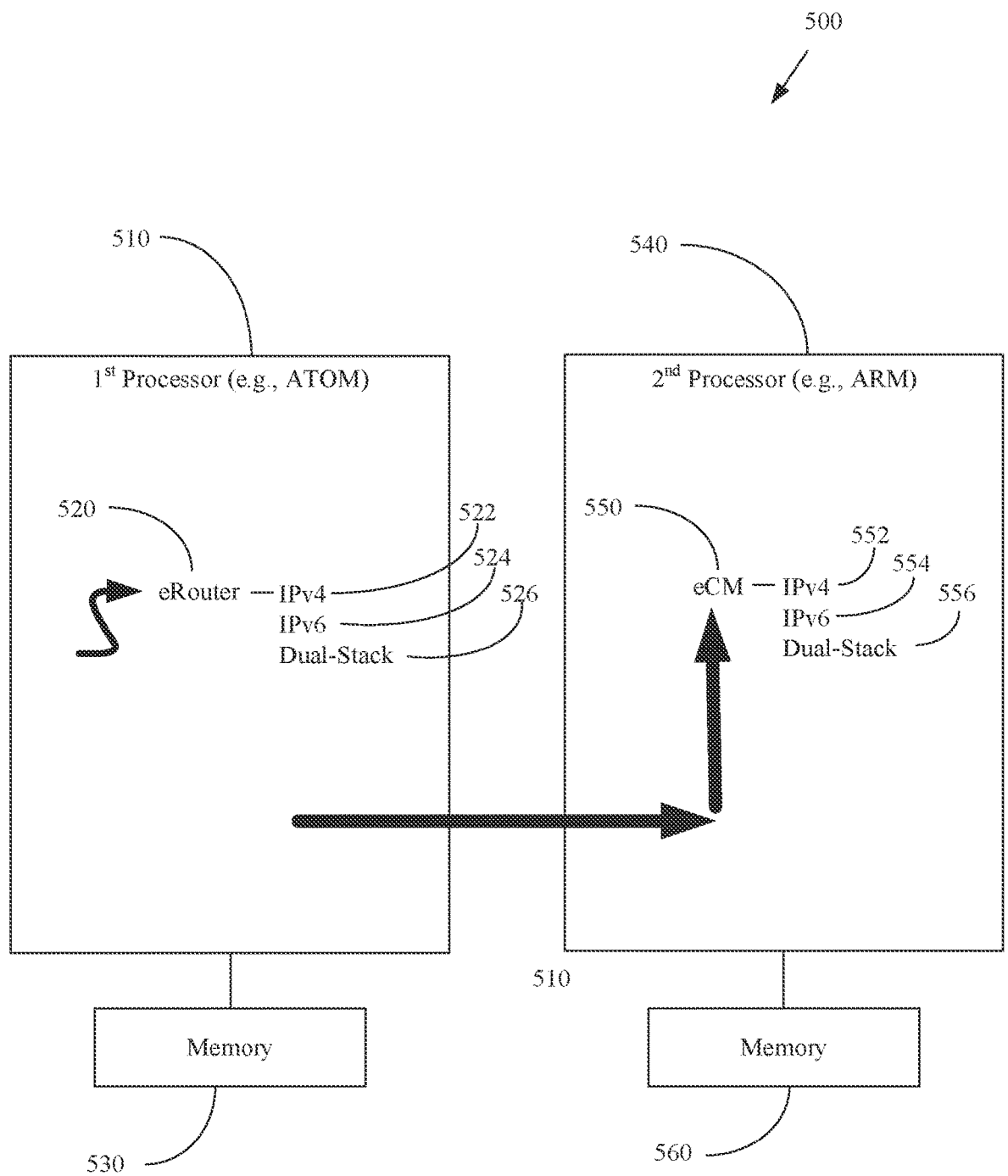
FIG. 5 illustrates processor configuration for an eRouter and an eCM according to the present invention.

FIG. 5 illustrates processor configuration 500 for an eRouter and an eCM according to the present invention.

In FIG. 5, a first processor 510 is shown for the eRouter 520. A second processor 540 is shown for the eCM 550. For example, first processor 510 may be an Intel Atom® processor and second processor 540 may be an ARM (advanced RISC machines) processor. ARM processors are based on the reduced instruction set computer (RISC) architecture. The first processor 510 has access to first memory 530. The second processor 510 has access to second memory 560. However, a single memory may be used to support both processors 510, 540. The first memory 530 may store instructions that are executed by the first processor 510 to provide the functions of eRouter 520 described herein. Similarly, the second memory 560 may store instructions that are executed by the second processor 540 to provide the functions of eCM 550 described herein. Other instructions and code may be stored on first processor 510 and second processor 540, such as configuration file 370, as illustrated in FIG. 3. Further, the first processor 510 may configure the eRouter 520 to implement an IPv4 mode 522, an IPv6 mode 524, or a dual-stack (DS) mode 526. The second processor 540 may configure the eCM 550 to implement an IPv4 mode 552, an IPv6 mode 554, or a dual-stack (DS) mode 556.

Figure 6:
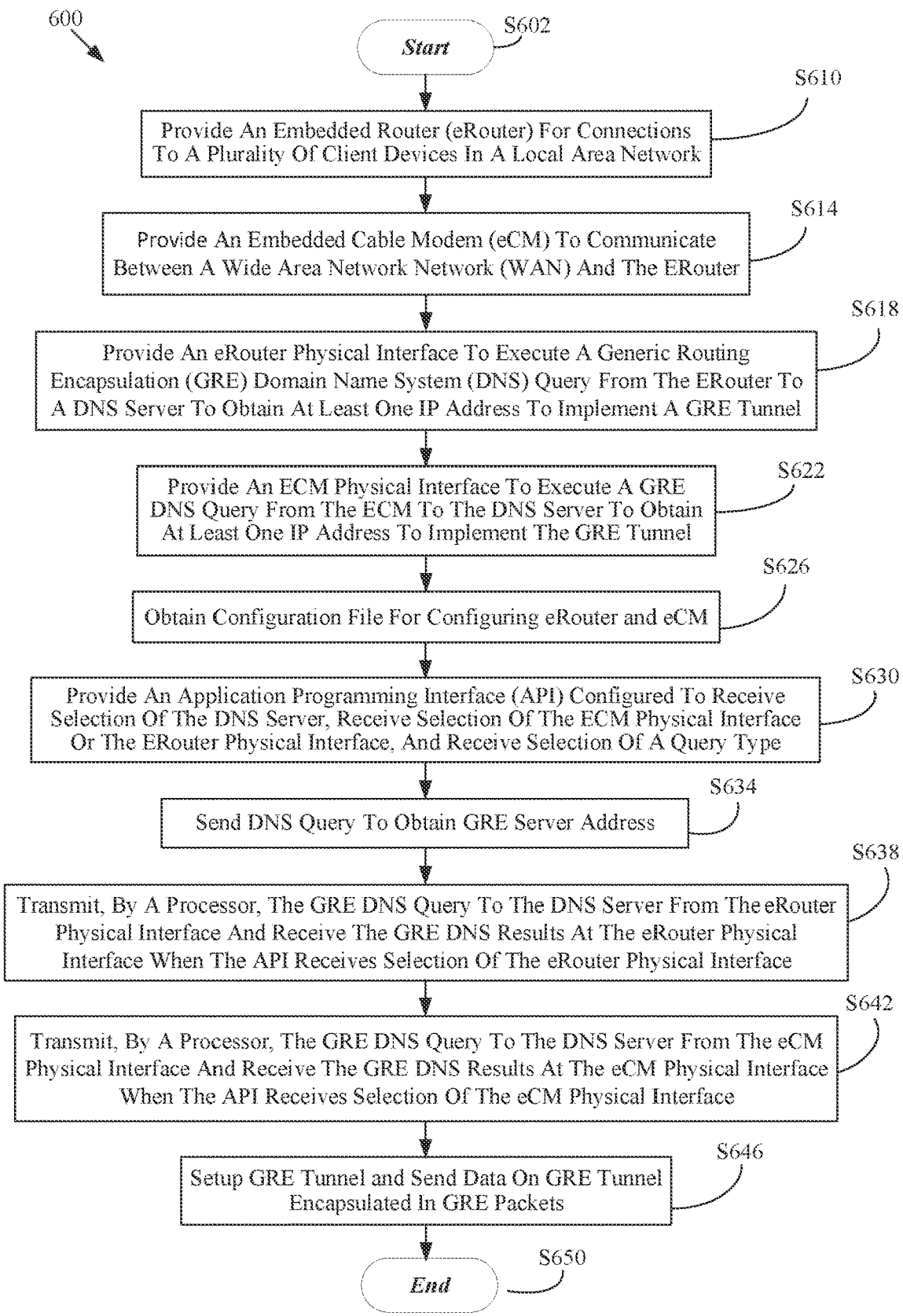
FIG. 6 is a flow chart illustrating a setup of a GRE tunnel using physical interfaces for the eRouter and eCM according to the present invention.

FIG. 6 is a flow chart 600 illustrating a setup of a GRE tunnel using physical interfaces for the eRouter and eCM according to the present invention.

In FIG. 6, method 600 starts (S602), and an embedded router (eRouter) is provided for connections to a plurality of client devices in a local area network S610. An embedded cable modem (eCM) is provided to communicate between a wide area network (WAN) and the embedded router (eRouter) (S614). An eRouter physical interface is provided to execute a generic routing encapsulation (GRE) domain name system (DNS) query from the eRouter to a DNS server to obtain at least one IP address to implement a GRE tunnel S618. An eCM physical interface is provided to execute a GRE DNS query from the eCM to the DNS server to obtain at least one IP address to implement the GRE tunnel S622. A configuration file is obtained for configuring the eRouter and the eCM (S626). An application programming interface (API) is provided that is configured to receive selection of the DNS server, receive selection of the eCM physical interface or the eRouter physical interface, and receive selection of a query type S630). A DNS query is sent to obtain GRE server address S634.

A processor transmits the GRE DNS query to the DNS server from the eRouter physical interface and receives the GRE DNS results at the eRouter physical interface when the API receives selection of the eRouter physical interface S638. A processor transmits the GRE DNS query to the DNS server from the eCM physical interface and receives the GRE DNS results at the eCM physical interface when the API receives selection of the eCM physical interface S642. The GRE tunnel is setup and data encapsulated in GRE packets are sent on the GRE tunnel (S646). The method 600 then stops (S650).

Figure 7:
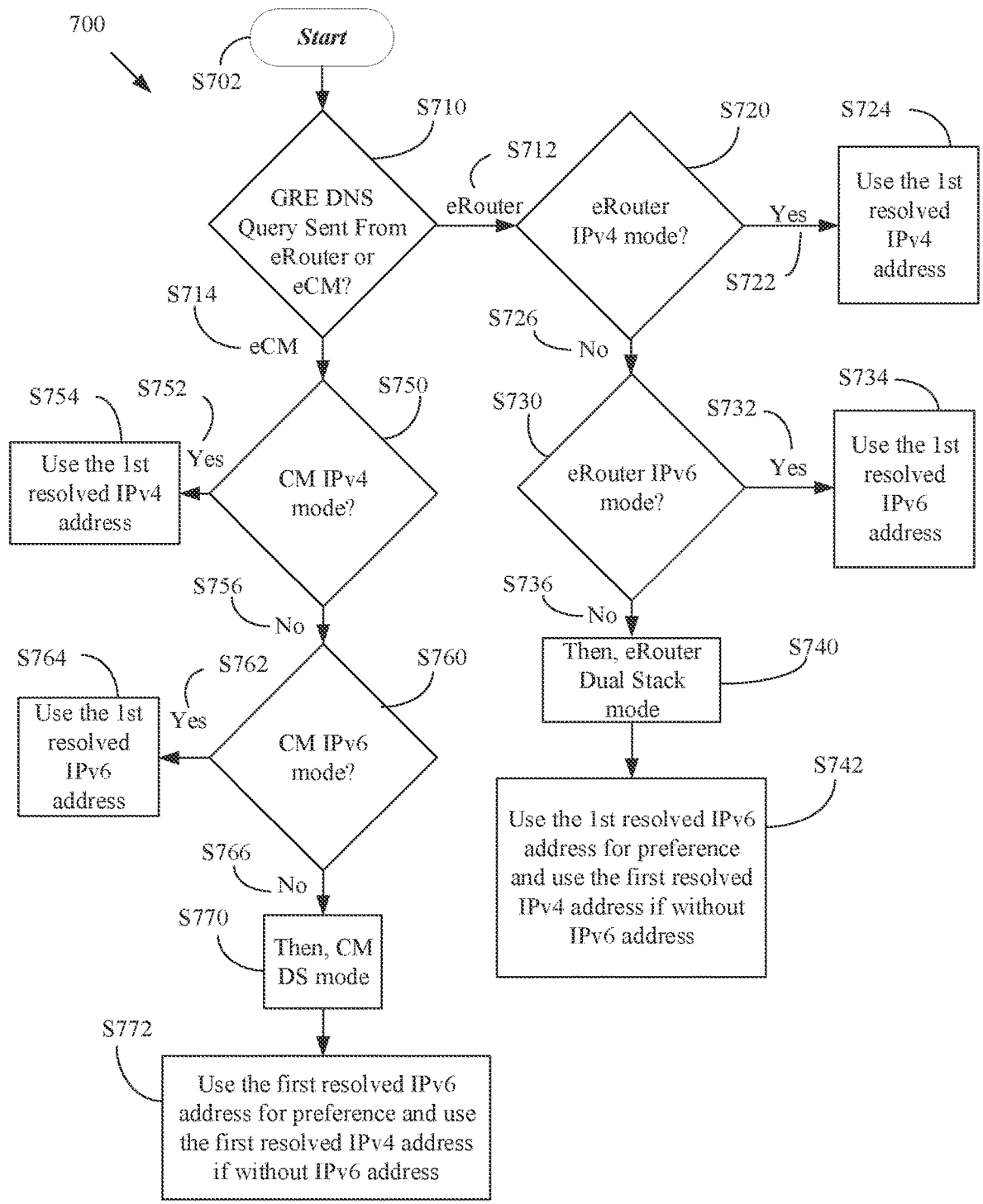
FIG. 7 is a flow chart illustrating resolution of DNS queries from the eRouter and eCM according to the present invention.

FIG. 7 is a flow chart 700 illustrating resolution of DNS queries from the eRouter and eCM according to the present invention.

In FIG. 7, method 700 starts (S702), and a determination is made whether the GRE DNS Query is sent from the eRouter or the eCM (S710). When the GRE DNS Query is sent from the eRouter (S712), a determination is made whether the eRouter is configured for an IPv4 mode (S720). When the eRouter is configured for the IPv4 mode (S722), the first resolved IPv4 address is used (S724). When the eRouter is not configured for the IPv4 mode (S726), a determination is made whether the eRouter is configured for an IPv6 mode (S730). When the eRouter is configured for the IPv6 mode (S722), the first resolved IPv6 address is used (S734). When the eRouter is not configured for the IPv6 mode (S736), then the eRouter is configured for the DS mode (S740) and the first resolved IPv6 address is preferred, but the first resolved IPv4 address is used when no IPv6 address is resolved (S742).

When the GRE DNS Query is sent from the eCM (S714), a determination is made whether the eCM is configured for an IPv4 mode (S750). When the eCM is configured for the IPv4 mode (S752), the first resolved IPv4 address is used (S754). When the eCM is not configured for the IPv4 mode (S756), a determination is made whether the eCM is configured for an IPv6 mode (S760). When the eCM is configured for the IPv6 mode (S762), the first resolved IPv6 address is used (S764). When the eCM is not configured for the IPv6 mode (S766), then the eCM is configured for the DS mode (S770) and the first resolved IPv6 address is preferred, but the first resolved IPv4 address is used when no IPv6 address is resolved (S772).

Figure 8:
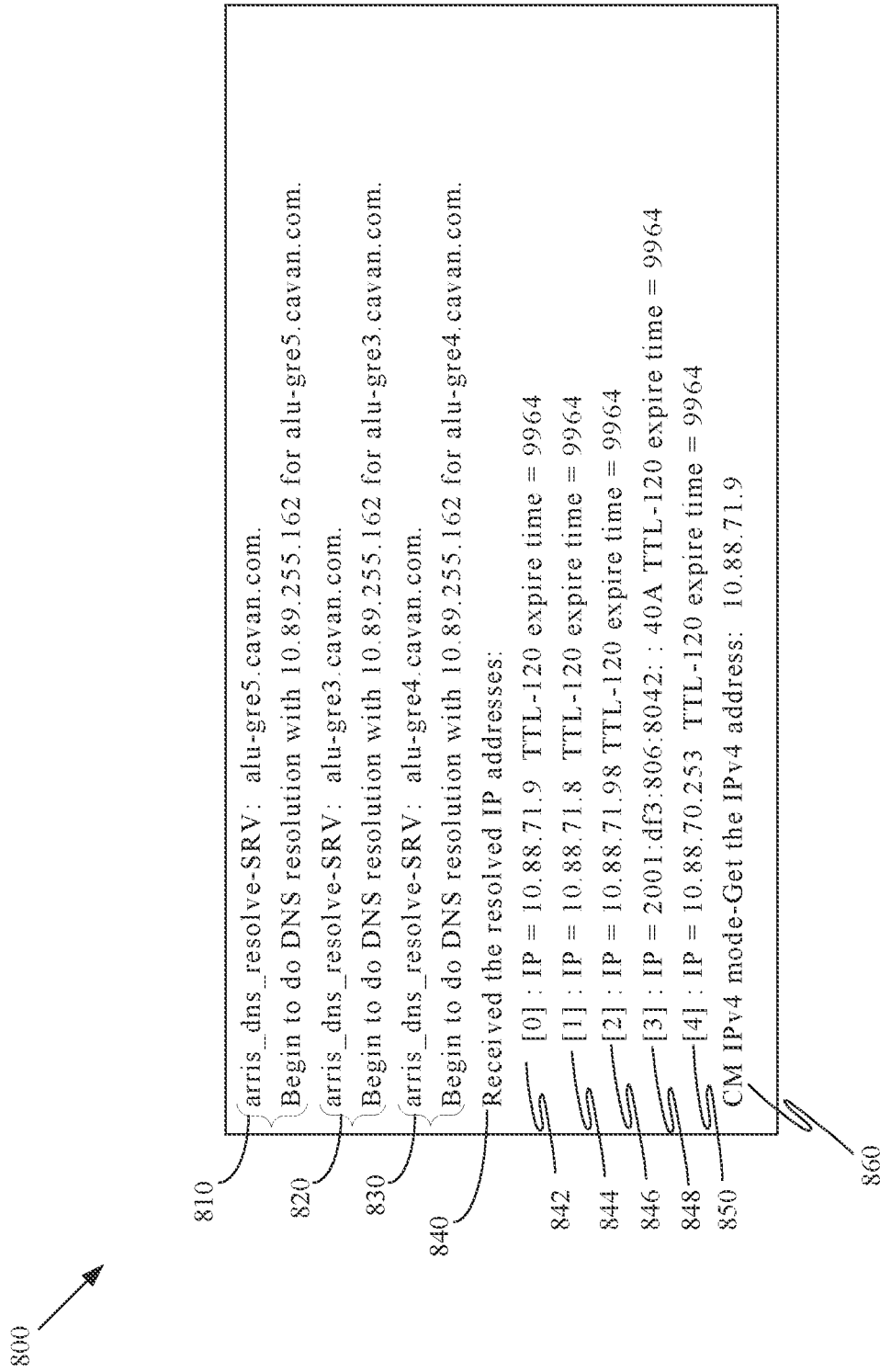
FIG. 8 illustrates a display of the resolution of DNS Queries according to the present invention.

FIG. 8 illustrates a display of the resolution of DNS Queries 800 according to the present invention.

DNS Service Record (SRV) resolution is initiated with DNS Server having IP address 10.89.255.162 for alu-gre5.cavan.com 810. Next, DNS Service Record (SRV) resolution is initiated with DNS Server having IP address 10.89.255.162 for alu-gre3.cavan.com 820. Then, DNS Service Record (SRV) resolution is initiated with DNS Server having IP address 10.89.255.162 for alu-gre4.cavan.com 830. Next, the resolved IP addresses that are received are shown 840.

- A first resolved IP address 842 is 10.88.71.9 with TTL—120 expire time=9964
- A second resolved IP address 844 is 10.88.71.8 with TTL—120 expire time=9964
- A third resolved IP address 846 is 10.88.71.98 with TTL—120 expire time=9964
- A fourth resolved IP address 848 is 2001:df3:806:8042::40A TTL—120 expire time=9964
- A fifth resolved IP address 850 is 10.88.70.253 with TTL—120 expire time=9964

The first 842, second 844, third 846, and fifth 850 received IP addresses are IPv4 resolved addresses. The fourth received address 848 is an IPv6 IP address. In the last line 860, because the eCM sent the DNS Query and is configured for IPv4 mode, the first IPv4 resolved address is used, i.e., 10.88.71.9.

Referring again to FIG. 3, a GRE DNS refresh also may be performed from the eCM physical interface 318 or from the eRouter physical interface 354.

A GRE DNS refresh is performed when:
The current connected GRE remote endpoint is not NULL.
The current used GRE remote endpoint IP address is in the previous resolved IP address list. (consider the GRE failover case).
The TTL expired (SRV or A/4A records).

The DNS refresh for SRV or A/4A are performed separately. When the DNS resolution action is repeated, when the new resolved results are different with previous ones, and current used endpoint isn't in the new resolved results, the GRE agent 380 must be restarted.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device, comprising:
an embedded router (eRouter) providing connections for a plurality of client devices in a local area network;
an embedded cable modem (eCM) bridging communication between a wide area network (WAN) network and the eRouter;
an eRouter physical interface to execute a generic routing encapsulation (GRE) domain name system (DNS) query from the eRouter to a DNS server to obtain at least one IP address to implement a GRE tunnel;
an eCM physical interface to execute a GRE DNS query from the eCM to the DNS server to obtain at least one IP address to implement the GRE tunnel;
an application programming interface (API) configured to receive selection of the DNS server, receive selection of the eCM physical interface or the eRouter physical interface, and receive selection of a query type;
a memory; and
at least one processor configured to execute instructions stored on said memory to cause said network device to:
transmit the GRE DNS query to the DNS server from the eRouter physical interface and receive the GRE DNS results at the eRouter physical interface when the API receives selection of the eRouter physical interface; and
transmit the GRE DNS query to the DNS server from the eCM physical interface and receive the GRE DNS results at the eCM physical interface when the API receives selection of the eCM physical interface.

2. The network device of claim 1 further comprising a GRE DNS agent to watch for an IP address change, and to inform the DNS server of a changed IP address, wherein the DNS server re-maps the domain name with the changed IP address.

3. The network device of claim 2, wherein the at least one processor executes the instructions stored on said memory to resolve an Internet Protocol (IP) address associated with a domain name by combining the API with an eRouter/eCM mode (IPv4/IPv6/Dual-stack) and a DNS name server type (IPv4/IPv6), wherein the eRouter/eCM mode comprises an IPv4 mode, an IPv6 mode, or a dual stack mode and the DNS name server type comprises IPv4 DNS servers or IPv6 DNS name servers.

4. The network device of claim 1, wherein the DNS query includes an SRV query, an A record query of the DNS server for an IPv4 address, and an AAAA record query of the DNS server for an IPv6 address, wherein the SRV query retrieves an SRV record that defines the location including the hostname and port number, the A record query returns an IPv4 address that is used for conversion of domain names to each IP address, and the AAAA record query retrieves the IPv6 address of the host associated with the DNS query.

5. The network device of claim 1, wherein the at least one processor comprises a first processor to send the DNS query to the DNS server using the eRouter physical interface and a second processor to send the DNS query to the DNS server using the eCM physical interface.

6. The network device of claim 1, wherein the at least one processor executes the instructions stored on said memory to resolve an IP address returned by the GRE DNS query to create the GRE tunnel according to:
when the DNS Query is from the eRouter, a resolved IP address for the GRE tunnel creation is selected according to: use a first resolved IPv4 address for the eRouter IPv4 mode, use a first resolved IPv6 address for the eRouter IPv6 mode, and use the first resolved IPv6 address and, when the first resolved IPv6 address is not available, use the first resolved IPv4 address for the eRouter dual stack (DS) mode, and
when the DNS Query is from the eCM, a resolved IP address for the GRE tunnel creation is selected according to: use the first resolved IPv4 address for the CM IPv4 mode, use the first resolved IPv6 address for the CM IPv6 mode, and use the first resolved IPv6 address and, when the first resolved IPv6 address is not available, use the first resolved IPv4 address for the CM DS mode.

7. The network device of claim 1, wherein a GRE DNS refresh is performed, using the eRouter physical interface or the eCM physical interface respectively, when a current connected GRE remote endpoint is not NULL, a current GRE remote endpoint IP address is in a previous resolved IP address list, and the Time-To-Live (TTL) for the current GRE remote endpoint IP address has expired.

8. The network device of claim 7, wherein the GRE DNS refresh for SRV or A/4A is performed separately.

9. A method of operating a network device, comprising:
providing connections for a plurality of client devices in a local area network using an embedded router (eRouter);
bridging communication between a wide area network (WAN) network and the embedded router using an embedded cable modem (eCM);
providing an eRouter physical interface to execute a generic routing encapsulation (GRE) domain name system (DNS) query from the eRouter to a DNS server to obtain at least one IP address to implement a GRE tunnel;
providing an eCM physical interface to execute a GRE DNS query from the eCM to the DNS server to obtain at least one IP address to implement the GRE tunnel;
providing an application programming interface (API) configured to receive selection of the DNS server, receive selection of the eCM physical interface or the eRouter physical interface, and receive selection of a query type;
storing data in memory; and
executing, by at least one processor, instructions stored on said memory to cause said network device to:
transmit the GRE DNS query to the DNS server from the eRouter physical interface and receive the GRE DNS results at the eRouter physical interface when the API receives selection of the eRouter physical interface; and
transmit the GRE DNS query to the DNS server from the eCM physical interface and receive the GRE DNS results at the eCM physical interface when the API receives selection of the eCM physical interface.

10. The method of claim 9 further comprising providing a GRE DNS agent to watch for an IP address change, informing the DNS server of a changed IP address, and remapping the domain name with the changed IP address by the DNS server.

11. The method of claim 10, wherein the at least one processor executes the instructions stored on said memory to resolve an Internet Protocol (IP) address associated with a domain name by combining the API with an eRouter/eCM mode (IPv4/IPv6/Dual-stack) and a DNS name server type (IPv4/IPv6), wherein the eRouter/eCM mode comprises an IPv4 mode, an IPv6 mode, or a dual stack mode and the DNS name server type comprises IPv4 DNS servers or IPv6 DNS name servers.

12. The method of claim 9, wherein the transmitting the DNS query includes transmitting an SRV query, an A record query of the DNS server for an IPv4 address, and an AAAA record query of the DNS server for an IPv6 address, wherein the SRV query retrieves an SRV record that defines the location including the hostname and port number, the A record query returns an IPv4 address that is used for conversion of domain names to each IP address, and the AAAA record query retrieves the IPv6 address of the host associated with the DNS query.

13. The method of claim 9, wherein the executing, by the at least one processor, comprises executing a first processor to send the DNS query to the DNS server using the eRouter physical interface and executing a second processor to send the DNS query to the DNS server using the eCM physical interface.

14. The method of claim 9 further comprising resolving the IP address using the DNS query results and creating the GRE tunnel according to:
when the DNS Query is from the eRouter, resolving IP addresses for the GRE tunnel creation by: selecting a first resolved IPv4 address for the eRouter IPv4 mode, selecting a first resolved IPv6 address for the eRouter IPv6 mode, and selecting the first resolved IPv6 address and, when the first resolved IPv6 address is not available, selecting the first resolved IPv4 address for the eRouter dual stack (DS) mode, and
when the DNS Query is from the eCM, resolving IP addresses for the GRE tunnel creation by: selecting the first resolved IPv4 address for the CM IPv4 mode, selecting the first resolved IPv6 address for the CM IPv6 mode, and selecting the first resolved IPv6 address and, when the first resolved IPv6 address is not available, selecting the first resolved IPv4 address for the CM DS mode.

15. The method of claim 9, wherein the at least one processor executes the instructions stored on said memory to perform a GRE DNS refresh using the eRouter physical interface and the eCM physical interface respectively, when a current connected GRE remote endpoint is not NULL, a current used GRE remote endpoint IP address is in a previous resolved IP address list, and the Time-To-Live (TTL) for the current GRE remote endpoint IP address has expired.

16. A non-transitory, computer-readable media having computer-readable instructions stored thereon, the computer-readable instructions being capable of being read by a network device to instruct the network device to perform the method comprising:
providing connections for a plurality of client devices in a local area network using an embedded router (eRouter);

bridging communication between a wide area network (WAN) network and the eRouter using an embedded cable modem (eCM);

providing an eRouter physical interface to execute a generic routing encapsulation (GRE) domain name system (DNS) query from the eRouter to a DNS server to obtain at least one IP address to implement a GRE tunnel;

providing an eCM physical interface to execute a GRE DNS query from the eCM to the DNS server to obtain at least one IP address to implement the GRE tunnel;

providing an application programming interface (API) configured to receive selection of the DNS server, receive selection of the eCM physical interface or the eRouter physical interface, and receive selection of a query type;

storing data in memory; and executing, by at least one processor, instructions stored on said memory to cause said network device to:

transmit the GRE DNS query to the DNS server from the eRouter physical interface and receive the GRE DNS results at the eRouter physical interface when the API receives selection of the eRouter physical interface; and transmit the GRE DNS query to the DNS server from the eCM physical interface and receive the GRE DNS results at the eCM physical interface when the API receives selection of the eCM physical interface.

17. The non-transitory, computer-readable media of claim 16, wherein the method further comprises providing a GRE DNS agent to watch for an IP address change, informing the DNS server of a changed IP address, and remapping the domain name with the changed IP address by the DNS server.

18. The non-transitory, computer-readable media of claim 17, wherein the at least one processor executes the instructions stored on said memory to resolve an Internet Protocol (IP) address associated with a domain name by combining the API with an eRouter/eCM mode (IPv4/IPv6/Dual-stack) and a DNS name server type (IPv4/IPv6), wherein the eRouter/eCM mode comprises an IPv4 mode, an IPv6 mode, or a dual stack mode and the DNS name server type comprises IPv4 DNS servers or IPv6 DNS name servers.

19. The non-transitory, computer-readable media of claim 16, wherein the transmitting the DNS query includes transmitting an SRV query, an A record query of the DNS server for an IPv4 address, and an AAAA record query of the DNS server for an IPv6 address, wherein the SRV query retrieves an SRV record that defines the location including the hostname and port number, the A record query returns an IPv4 address that is used for conversion of domain names to each IP address, and the AAAA record query retrieves the IPv6 address of the host associated with the DNS query.

20. The non-transitory, computer-readable media of claim 16, wherein the method further comprises resolving the IP address using the DNS query results and creating the GRE tunnel according to:

when the DNS Query is from the eRouter, resolving IP addresses for the GRE tunnel creation by: selecting a first resolved IPv4 address for the eRouter IPv4 mode, selecting a first resolved IPv6 address for the eRouter IPv6 mode, and selecting the first resolved IPv6 address and, when the first resolved IPv6 address is not available, selecting the first resolved IPv4 address for the eRouter dual stack (DS) mode, and when the DNS Query is from the eCM, resolving IP addresses for the GRE tunnel creation by: selecting the first resolved IPv4 address for the CM IPv4 mode, selecting the first resolved IPv6 address for the CM IPv6 mode, and selecting the first resolved IPv6 address and, when the first resolved IPv6 address is not available, selecting the first resolved IPv4 address for the CM DS mode.

\* \* \* \* \*